US009823157B2

(12) United States Patent
Agbakwuru et al.

(10) Patent No.: US 9,823,157 B2
(45) Date of Patent: Nov. 21, 2017

(54) TOOL FOR LEAK POINT IDENTIFICATION AND NEW METHODS FOR IDENTIFICATION, CLOSE VISUAL INSPECTION AND REPAIR OF LEAKING PIPELINES (71) Applicant: Universitetet i Stavanger, Stavanger (NO)

(72) Inventors: Jasper Ahamefula Agbakwuru, Tjelta (NO); Ove Tobias Gudmestad, Nærbø (NO)

(73) Assignee: Universitetet i Stavanger, Stavanger (NO)

( * ) Notice: Subject to any disclaimer, the term of this patent is extended or adjusted under 35 U.S.C. 154(b) by 281 days.

(21) Appl. No.: 14/429,895

(22) PCT Filed: Sep. 23, 2013

(86) PCT No.: PCT/NO2013/050160
§ 371 (c)(1),
(2) Date: Mar. 20, 2015

(87) PCT Pub. No.: WO2014/046550
PCT Pub. Date: Mar. 27, 2014

(65) Prior Publication Data
US 2015/0241296 A1 Aug. 27, 2015

Related U.S. Application Data (60) Provisional application No. 61/703,786, filed on Sep. 21, 2012.

(51) Int. Cl.
*H04N 9/47* (2006.01)
*H04N 7/18* (2006.01)
(Continued)

(52) U.S. Cl.
CPC ............... *G01M 3/08* (2013.01); *B63C 11/48* (2013.01); *B63C 11/52* (2013.01); *F16L 1/26* (2013.01);
(Continued)

(58) Field of Classification Search
None
See application file for complete search history.

(56) References Cited

U.S. PATENT DOCUMENTS 3,838,434 A * 9/1974 Hughes ............... G03B 17/08
396/27
5,369,455 A * 11/1994 Mayer ................... G03B 11/00
396/28
(Continued)

FOREIGN PATENT DOCUMENTS

| GB | 2493366 A | 2/2013 |
| JP | H04160334 A | 6/1992 |
| WO | WO-9201190 A2 | 1/1992 |

OTHER PUBLICATIONS

Det Norske Veritas (DNV); "Recommended Practice DNV-RP-F116: Integrity Management of Submarine Pipeline Systems"; Oct. 2009; 62 pages.
(Continued)

*Primary Examiner* — Sath V Perungavoor
*Assistant Examiner* — Xiaolan Xu
(74) *Attorney, Agent, or Firm* — Winstead PC (57) ABSTRACT An apparatus for close visual inspection of subsea pipelines comprises a housing with a chamber that has an open side. The open side is adapted to be placed in sealing engagement against the pipeline. The chamber is flooded with clear water to improve the visual view. It is also described an apparatus for identification of a plume exiting from a leak The apparatus comprises a housing defining a chamber with a water permeable side that is adapted to face downward during use,
(Continued)

and thereby being exposed to the exiting substance. A gas pressurizing device for creates a gas/water interface within the housing. An imaging device arranged above the water surface is adapted to image the water surface and detect id the water surface is being disturbed by the plume.

18 Claims, 9 Drawing Sheets

(51) Int. Cl.

| | |
|---|---|
| G01M 3/08 | (2006.01) |
| B63C 11/48 | (2006.01) |
| F17D 5/00 | (2006.01) |
| F16L 55/172 | (2006.01) |
| F16L 55/175 | (2006.01) |
| B63C 11/52 | (2006.01) |
| F16L 1/26 | (2006.01) |
| H04N 5/225 | (2006.01) |
| B63G 8/00 | (2006.01) |

(52) U.S. Cl.
CPC .......... *F16L 55/172* (2013.01); *F16L 55/175* (2013.01); *F17D 5/00* (2013.01); *H04N 5/2252* (2013.01); *H04N 5/2256* (2013.01); *B63G 2008/007* (2013.01); *H04N 2005/2255* (2013.01)

(56) References Cited

U.S. PATENT DOCUMENTS 5,467,640 A * 11/1995 Salinas ............... E03F 7/12
  254/134.4
5,678,091 A * 10/1997 Daspit ............... B63C 11/49
  348/375
2006/0065320 A1  3/2006 Borland et al.

OTHER PUBLICATIONS

Bråten, Knut, "International Search Report," prepared for PCT/NO2013/050160, dated Dec. 16, 2013, five pages.

* cited by examiner

TOOL FOR LEAK POINT IDENTIFICATION AND NEW METHODS FOR IDENTIFICATION, CLOSE VISUAL INSPECTION AND REPAIR OF LEAKING PIPELINES

The present invention relates to devices and methods for leak detection and leak repair of pressure containment structures in the marine environment, such as oil or gas pipes. Such structures are common in the oil and gas industry. Prolonged leaks and spills to the environment are very unfriendly to the marine ecosystem and to the environment in general, and it is therefore a great demand for devices and methods to prevent large spills to the environment.

The first step in reinstating a leaking containment is to detect the point of leak, inspect it and then to carry out appropriate repair. Containments in unclear water presents even more challenges in this condition. The presented innovation enables the challenges posed by unclear water conditions to be managed adequately.

The present invention therefore proposes a new leak point identification tool to locate the exact point of leak.

The present invention also discusses new methods that could be used, together with the identification tool to conduct a close visual examination and effect repair of a leak.

BACKGROUND PRIOR ART

The methods for visually identifying leaking points on subsea pipelines are predominantly, the use of underwater inspection divers and the application of Remotely Operated Vehicles (ROV) equipped with visual and/or several of acoustic/fluorescent/hydrocarbon sensory detection tools. Detecting the leaking point is important because it is a prerequisite to inspections and subsequent actual repair activity.

In muddy water, divers rely on the sensory of the exiting plume of leaking pressure containments such as pipelines to identify the point of leak. The principle is that the leak comes from the base origin of the plume. It is believed that this approach is most exact in all sea conditions and underwater visibility states. The growth in technology requires that a new approach be made in utilizing this phenomenon.

State of the art technology does not solve the existing problems of identifying exact leaking points of structures, such as pipelines, independent of water clarity and by using the effect of plumes.

The limitation with the state-of-the-art technology is considered to be as follows: Search for leaking points by divers in unclear water is achieved by hand feelings of plume exiting from the pipeline break. This procedure has its safety limitations in hazardous hydrocarbon plume. On the other hand, an ROV installed with the best optical camera would see inadequately in muddy water. The poor underwater visibility problem could be due to natural condition of the water (rain sweeps, tidal actions, etc.) or by the action of ROV's thrusters on the subsea bottom in case the seabed is of sediment soil that clouds the visibility.

The present most advanced technology for identification of leaks in marine pipelines and inspection is the use of various forms of acoustic/sonic systems. Acoustic or magnetic flux systems could also be used on intelligent pigs running through the pipeline system. Other systems are hydrocarbon leak detectors that are sensitive to hydrocarbons and the fluorescence techniques. The acoustic and magnetic flux systems require expert interpretations of acquired data and are relatively expensive to operate. The systems are also prone to errors in some cases, for instance, noise from thrusters or sound from adjacent subsea facilities could mislead an acoustically operated leak finder. It is noted that acoustic close range detection of underwater objects is more difficult when the objects are buried in the seabed.

Sediments generate high backscattering noise due to heterogeneous scatters within the sediments clouding the object. The acoustic wave attenuation in sediments is also much higher than in water. Also some low pressure, large breaks in oil pipelines are low acoustic generators and therefore may not be found. For old and aged pipelines brittle fracture propagation can result, in case of the use of high pressure in running or operating pigs in the pipelines. Pigs can abnormally be trapped in the pipeline complicating the problem. The fluorescent and the hydrocarbon leak detectors are difficult to use in very poor underwater visibility conditions. Even in clear water, the applications of fluorescence or hydrocarbon detection sensors would require to sniff close to the suspected leak area. Water waves and currents can misguide the interpretation, especially in unclear water.

In our present innovation, identification of leaking point is made by tracing the signature of the plume generated by a minimal low internal containment pressure within the leaking structure. It has the capability to operate independent of water clarity. It does not require expert interpretation as it is visually tracking the exiting plume from the pipeline. It can use cheap real time technology in the identification process.

Identification, Inspection and Clamping (IIC) Leaking Pipelines Installed in Unclear Water Using an ROV Platform When the leak has been identified, pipeline repair activity in general requires a range of planning and investigations prior to the actual repair. This includes but is not limited to investigation of the damage, the pipe condition, consequences for the pipeline operation and planning of uncovering and seabed preparation. For instance, the mechanical pressure clamps are usually considered for temporary repairs; however, many subsea clamps are often not replaced and become a permanent repair subject to regular inspection, in particular when the pipeline inspection would also be difficult to implement in all clock positions of the pipeline where underwater visibility is poor. According to DNV-RP-F116, a close visual inspection is the best available method for detecting all threats and for providing the best understanding of the pipeline's damaged conditions. DNV-RP-F116 is a recommended practice for integrity management of submarine pipeline systems. Other situations include cofferdams and pipeline beach pull installations where polyethylene or similar wraps on pipeline weld joints could get damaged without notice due to unclarity of the water condition in the shallows.

A diverless technology of identification, close visual inspection and repair of leaking pipelines under such unclear water condition is presently not developed. There is presently no method that combines detection, inspection and repair on a single platform in all pipeline leak positions and in all conditions of water clarity.

The limitation with the state-of-the-art technology is considered to be as follows: If the exact point of leak is not found and inspected, adequate repair using remotely operated system is almost impossible. Inspection in unclear water in shallow is often carried out by 'hand feelings' by underwater divers. The results for pipeline leak repairs are trial and error attempts and a repair-leak-repair cycle often results, causing continued pollution to the environment. For an ROY equipped with fluorescent and hydrocarbon leak detectors, operation in muddy water is a challenge that needs to be dealt with. As described earlier, even in clear water, the applications of fluorescence or hydrocarbon detection sensors would require sniffing close to the suspected leak area. There is no known ROY platform that identifies and enables close visual inspection and, perhaps, effect repair of leaking structures in muddy water condition.

In the present invention, a common platform for identification, inspection and clamping the pipeline leak is presented (the IIC concept). It has the capability to operate independent of water clarity. It does not require expert interpretation as it is visually inspecting the broken structure of the pipeline. It can also use cheap real time technology in the inspection process.

In a particular aspect of the present invention it includes a flooding box, a digital video camera and illumination lamps. This device can also be used independent of an ROV, e.g. as a hand held tool by divers. The invention does not see the differences and sources of unclarity, it displaces whatever the unclear water is with pressured-clear water that the camera can see through.

In a first aspect the present invention defines an apparatus for close visual inspection of containment structures, such as pipelines, in the marine environment, especially in muddy or unclear water, comprising a housing having a chamber that has an open side, the open side being adapted to be placed in sealing engagement against the containment structure to be inspected, a imaging device, such as a camera, situated within the chamber or situated in a sealed compartment with a transparent wall towards the chamber, and a source of clear water for flooding the chamber with clear water.

This apparatus is capable of providing a clear view for the imaging device towards the leaking containment so to avoid or reduce the need of post-processing of the image. The image quality can be greatly improved by substantially removing the unclear water between the imaging device and the containment.

Preferably, a light source is arranged within the chamber or in a sealed compartment with a transparent wall towards the chamber. This enables the imaging device to see the surface also in dark waters, such as at deep waters or in muddy waters.

The chamber is preferably generally shaped to form a complementary interface with a pipeline. Thereby the unclear water can be replaced by clear water also very close to the pipeline.

In an alternative embodiment the chamber comprises a first part extending over about half the circumference of a cylinder, at least one second part that extends over less than half the circumference of the cylinder, the second part being coupled to the first part via a flexible casing, such as a bellows, so that the second part can be moved, e.g. hingedly, relative to the first part along the circumference of the pipeline. Thereby it is possible to circumscribe a large portion of the circumference of the pipeline and identify leaks over a larger extent of the pipeline.

Preferably, the first part, the at least one second part and the casing, when fully extended, cover the whole circumference of the pipeline. Thereby it is possible to identify leaks all around the circumference of the pipeline.

Even more preferably, the apparatus is arranged on an ROV or similar, which will provide diverless access to containment structures.

In a preferred embodiment, an exit port having a valve is in communication with the chamber in order to expel unclear water from the chamber.

In another aspect of the invention it provides a method for performing close visual inspection of containment structures, such as pipelines, in the marine environment, especially in muddy or unclear water, comprising forming an envelope of clear water near the outer surface of the containment structure, placing an image device within or close to the envelope of clear water, so that the image device has a substantially unobstructed view of the surface, and communicating image data from the image device to a topside facility.

This method will provide a clear view from the imaging device to the containment structure.

In a preferred embodiment, the envelope of clear water is created within a chamber in a housing having an open side towards the structure to be inspected. This makes it easier to uphold the envelop of clear water over a prolonged time.

By having the supply of clear water continuous, the envelope can be upheld over a very long time.

In a third aspect the invention provides an apparatus for identification of exiting substance from broken or leaking underwater equipment, such as a pipeline, comprising a housing defining a chamber with a water permeable side that is adapted to face downward during use, and thereby being exposed to the exiting substance, a gas pressurizing device for creating a gas/water interface within the housing, and an imaging device arranged above the water surface of the gas/water interface, the imaging device being adapted to image the water surface.

This apparatus is capable of detecting the plume of outflow from a leak. When the outflow disturbs the water/gas interface, the imaging device will see a different picture than if the water surface is relatively calm. The more the surface is disturbed, the stronger the impact of the plume is. This effect can be used to find the origin of the plume.

In a preferred embodiment the imaging device is at least one infra-red camera. An infrared camera has proved to provide a better recognition of the disturbance of the surface than a visual light camera.

By having the apparatus being carried by an ROV, it is easier to follow the plume towards its origin.

In a fourth aspect of the present invention it provides a method for identification of exiting substance from broken or leaking underwater equipment; such as a pipeline, wherein a housing containing an imaging device is submerged to a position above the underwater equipment, that a gas/water interface is created within the housing, that the gas/water interface is being exposed to the exiting substance so that presence of exiting substance may disturb the gas/water interface, and that the imaging device images the gas/water interface in order to detect if the gas/water interface is being disturbed.

This method makes it possible to detect the plume of outflow from a leak. When the oufflow disturbs the water/gas interface, the imaging device will see a different picture than if the water surface is relatively calm. The more the surface is disturbed, the stronger the impact of the plume is. This effect can be used to find the origin of the plume.

In a preferred embodiment, the housing is moved to maximise the disturbance and thereby locate the approximate origin of the leak causing the exiting substance when a disturbance of the gas/water interface is being detected.

Preferably, the gas/water interface is imaged in infra-red light, which has proved to be superior over visible light.

By attaching the housing to an ROV, the method can be used on greater water depths and it will be easier to follow the plume towards its origin.

In a fifth aspect the invention provides a clamp for sealing a leak in a pipeline, comprising two halves that are arranged to be connected around a pipeline, wherein each half comprises a double shell having an inner and an outer shell, whereby the space between the shells may be filled with a filler, such as concrete, epoxy or similar.

This will provide a clamp that is relatively easy to install but also can be used to permanently seal the leak.

The present invention will now be described in more detail, referring to specific, non-limiting, embodiments of the invention, as shown in the drawings, where.

DESCRIPTION OF SUBSEA PIPELINE LEAK IDENTIFICATION TOOL

The following gives a description of the underwater pipeline leak identification tool and method under reference to FIGS. 1-4. The configuration and shape of the system may vary, but the common operational characteristics are the same. The working principle of the camera used is detailed below.

Figure 1:
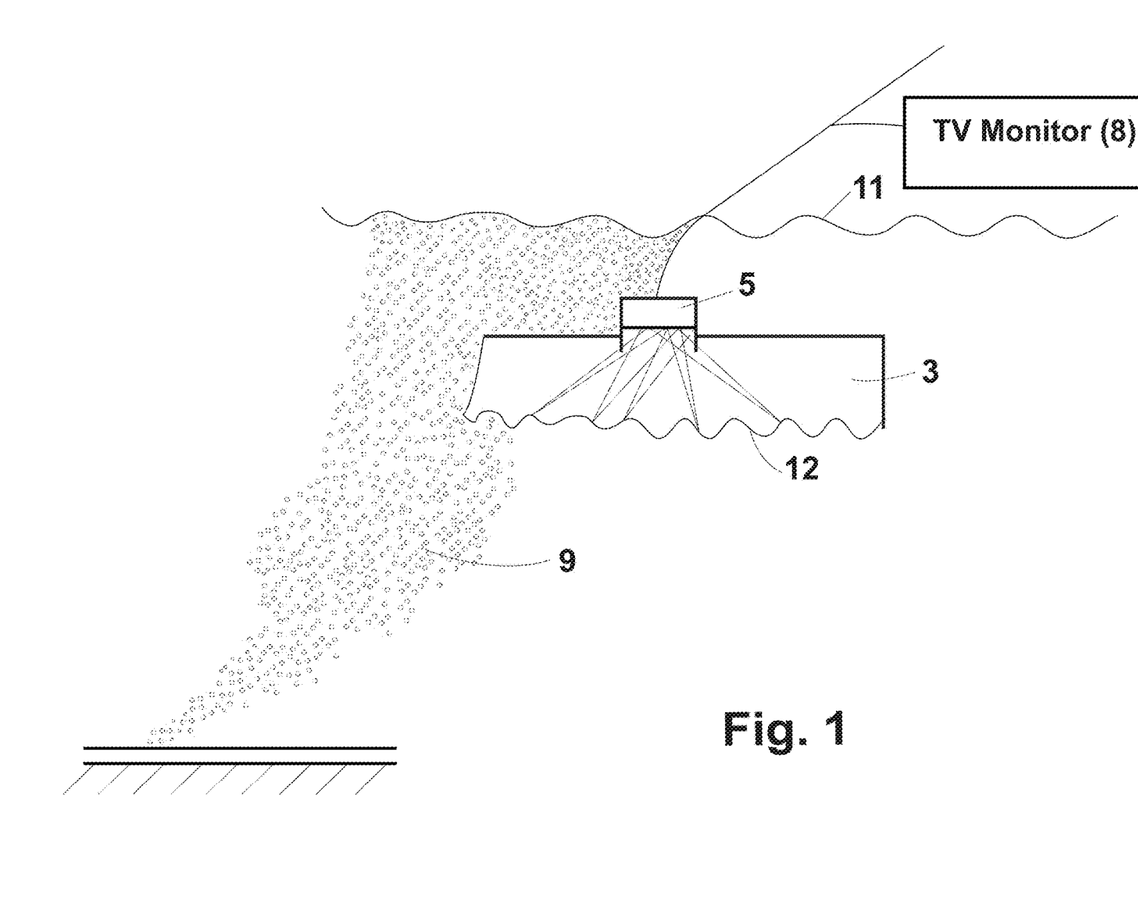
FIG. 1 shows the principles of the ROV carried leak identification tool.
Figure 2:
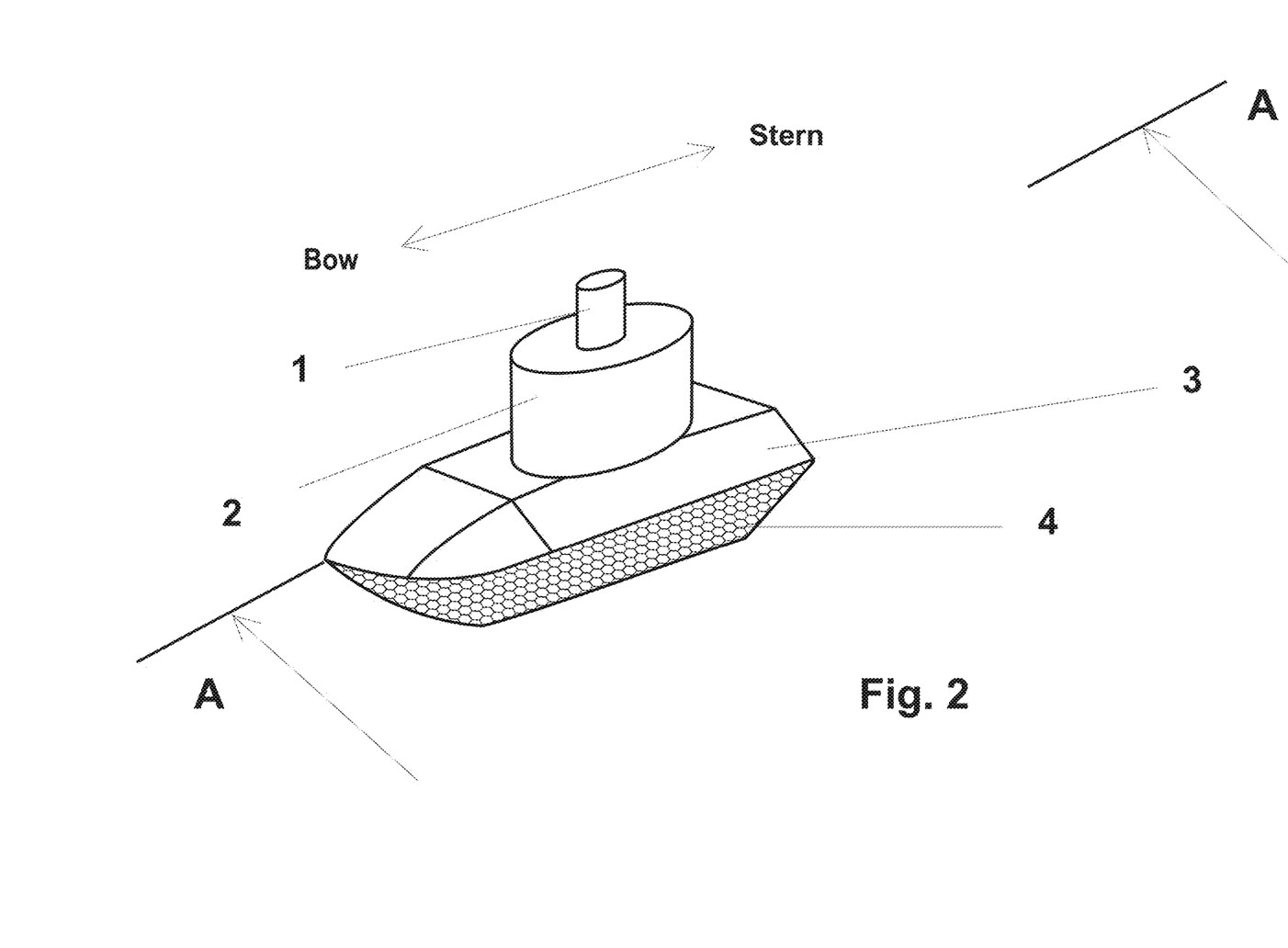
FIG. 2 shows the ROV leak identification tool.
Figure 3:
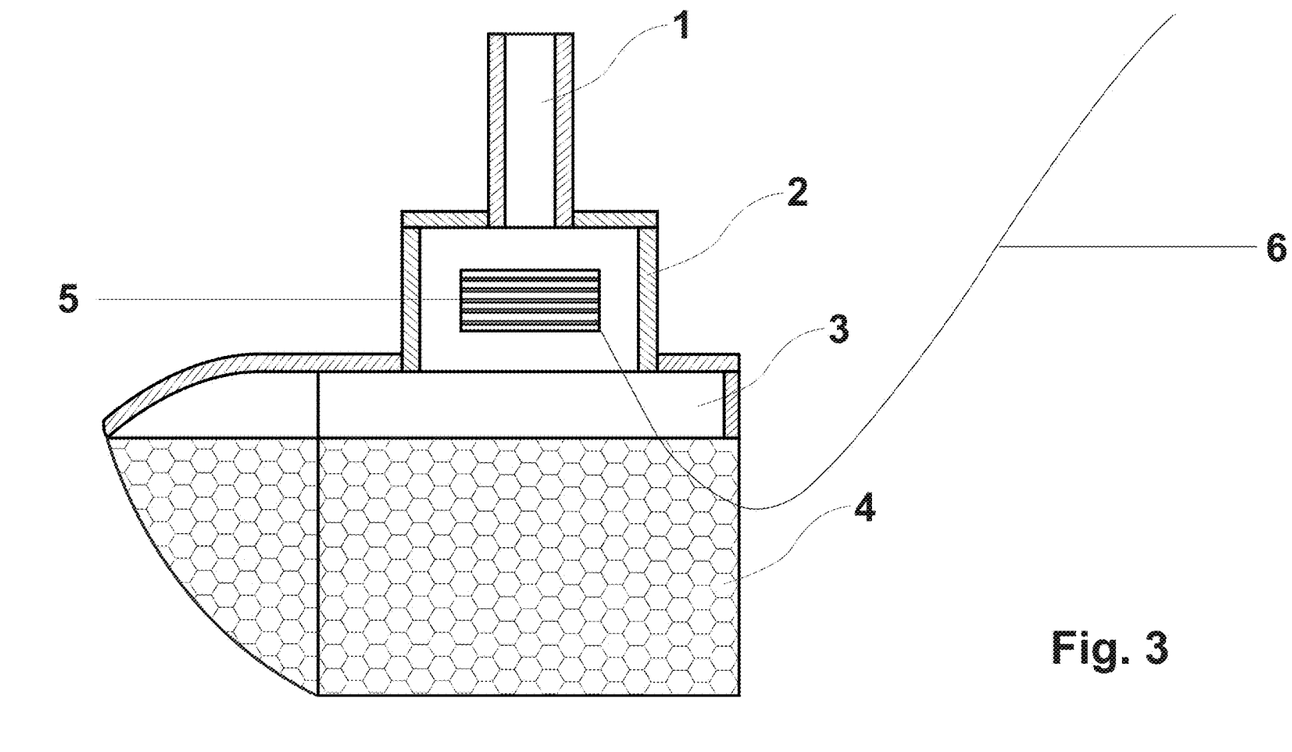
FIG. 3 shows a cross section through the leak identification tool.
Figure 4:
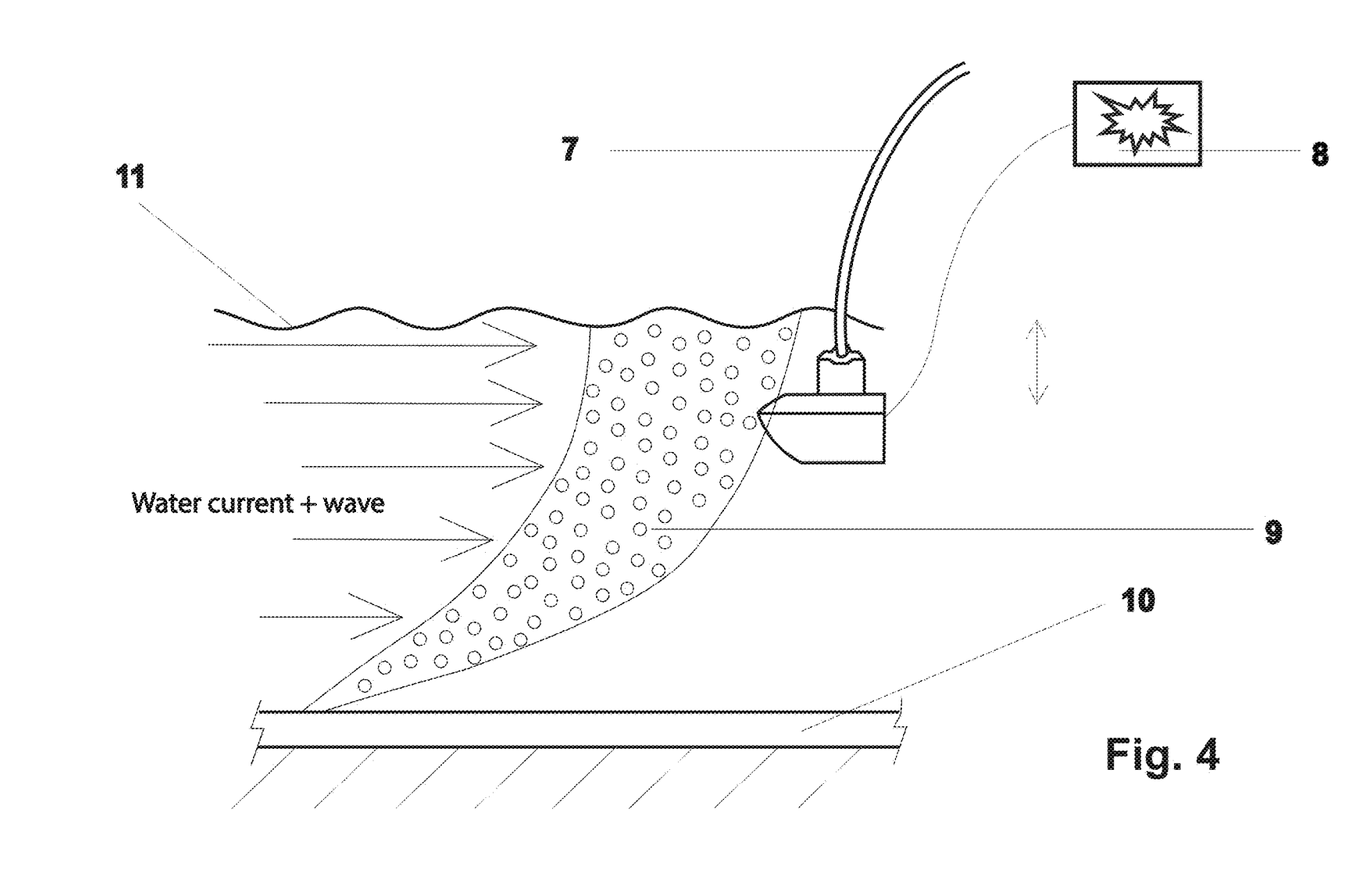
FIG. 4 shows the leak identification tool in operation.

The identification tool consists of one or several of imaging systems, such as camera systems 5, that can be visual or infra-red, boxed in an enclosure 2, having an air or other type of gas inlet system 1 and 7 for pressurizing a plume tray 3 and a plume inlet mesh 4. The identification tool is made to follow the upstream or downstream of an exiting plume 9 from a broken submarine pipeline 10. Note that the plume may not flow directly upwards due to the water current and surface wave. The tool simply peeps through, into the plume to allow substance (air/gas or liquid) within the plume to be collected in the plume tray 3. The plume tray 3 is slightly air-pressurized, just about the water column between the water surface 11 and about mid height of the plume tray as shown in FIG. 3. This ensures that the water level in the system is always below the visual surface of the imaging systems (hereinafter exemplified as infra-red camera system). Thus, the infra-red camera system is able to monitor the upward momentum and infra-red property variations in the exiting plume. The signal is tracked on a surface TV or PC monitor 8. The operator therefore uses the availability and strength of this signal to follow the plume from the surface of the water 11 to the bottom where the leaking pipe 10 is located, thus identifying the leaking point. Observe that when the tool is away from the plume window, the upward momentum and the infra-red signal are significantly minimized and in some cases unavailable and not being observed on the monitor 8.

An infra-red light source may be used to light up the water surface with infra-red light.

The identification tool is meant to be mounted on an ROV. However, it can also be carried by a diver, especially where the plume exhaust is considered safe to the underwater diver. A communication would therefore be required between the diver and the surface operator.

The working principle of the Optic Camera With Infra-red Output

In poor visible water conditions, an optical camera without an infra-red output function sees black. If the camera has a normal lightening lamp, it sees blank due to much scattering of light by the particulates in the unclear water. On the other hand, a camera with an infra-red output function will activate its infra-red light in a visually poor condition. This is done automatically by the camera used in the work. The infra-red light is non-visible to the human eye, but its output light lightens up the surrounding in the infra-red spectrum in similar way as the visible light lightens up a dark room. The infra-red light emitted by the camera is reflected back, received and processed by the camera. FIG. 1 shows an air-pressurized plume detector as shown in FIGS. 2 and 3 receiving plume signal in the pressurized chamber. The plume signal is simply a reflection of the unstable water surface 12 in the chamber 3 due to the pluming activities.

FIG. 1 shows the principle of the plume identification tool with pressurized air/water surface 12. The camera is not a thermal imaging camera. The optimal signal is dependent on the strength of the plume activity on the water surface 12 enclosed by the detector.

Infra-red is easily absorbed by liquid. The optical signal is observed to be minimal and less clear if the camera system is immersed in water. The less surface area of the pluming substance on the camera's small surface implies minimal plume event is noticed. However, by creating a relatively large air/water surface below the camera, detection of the plume by the disturbed water surface is greatly enhanced.

Description of Subsea Pipeline Leak Identification, Inspection and Clamping Method (IIC)

In the following is given a description for an underwater pipeline leak identification, inspection and clamping method on a common ROV platform referring to FIGS. 5-8. The configuration of the system could vary depending on the form of the underwater pipeline structure. The common operational characteristic however, is the same. Where the pipeline is buried below the seabed (which is often the case), the first action required after identification of the leak position is to uncover the pipeline from overburden to provide access to the pipeline before inspection and/or repair is possible. The jetting or overburden removal tool is not shown in the drawing.

Figure 5:
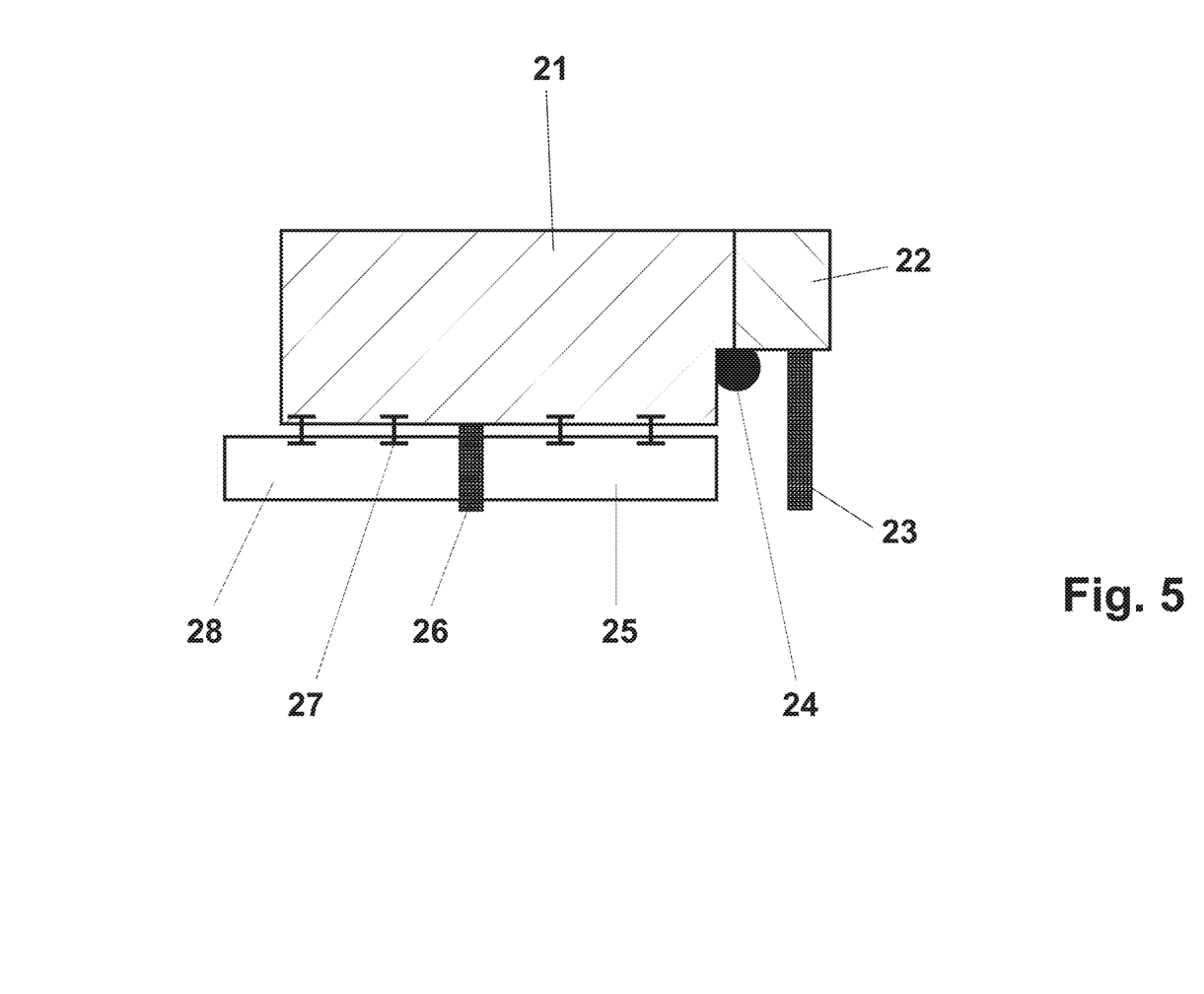
FIG. 5 shows the ROV carried leak inspection tool in longitudinal section.
Figure 6:
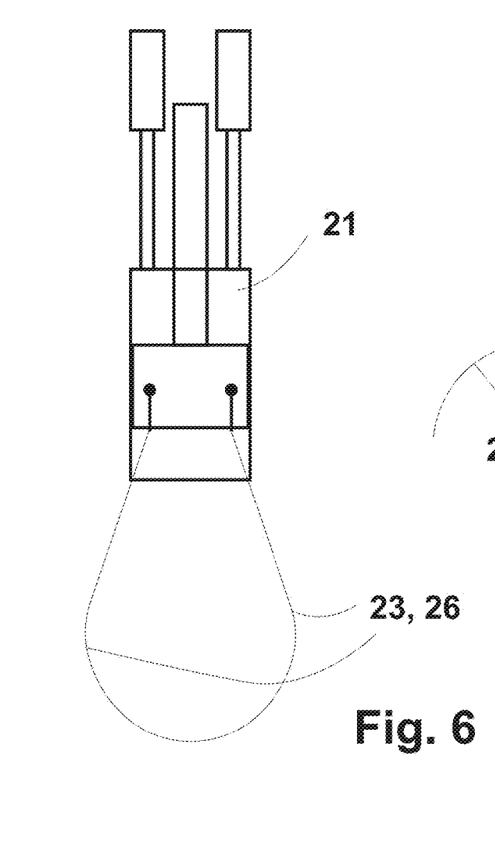
FIG. 6 shows the leak inspection tool of FIG. 5 in longitudinal section and with gripper arms closed.
Figure 7:
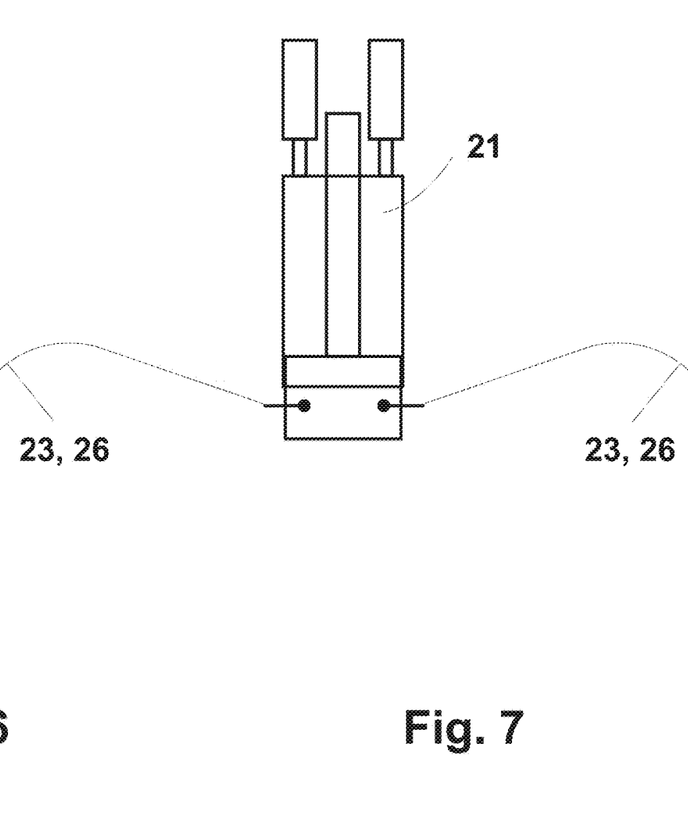
FIG. 7 shows the same view as FIG. 6, but with gripper arms open.

The leak inspection ROV 21 may consist of one or several of leak identification tools 22, a leak inspection tool 25 and a repair (e.g. a clamping) tool 28. These are mounted or latched by suitable attachment means 27 to the ROV 21. The identification tool 22 is mounted on the ROV 21 to track the leaking point. The ROV 21 is the vehicle that drives the IIC installation. The identification tool 22 could be detecting the plume signal from a broken subsea pipelines system, leading the ROV from the top of the water surface to the sea bottom where the leak (plume) is originating from. The leak identification tool 22 could operate by monitoring the infra-red and/or momentum signal of a plume, such as the tool described above in connection with FIGS. 1-4. Aligning tools 23 and 26 grab and align the ROV with the leaking structure, e.g. pipeline. FIG. 6 shows the position of the grabbing arms 23, 26 during operation to hold on to a pipeline and FIG. 7 shows the un-actuated or free swimming position with the arms 23, 26 outward.

Echo sounders and magnetometers could also be used for the alignment process. Then the pipeline is uncovered by jetting or any other suitable method. It is noted that blurred visibility underwater could be possible where the water clarity is between good and poor visibility conditions. An ROV camera 24 is used to guide and steer the ROV 21 where possible. Note that the overburden removal (e.g. jetting) tool is not shown in FIGS. 5-7.

With the pipeline exposed adequately, the overburden removal system is de-latched and the inspection 25 and repair 28 tools are latched on. The inspection tool 25 enables surface engineers to visually perform close inspection on the pipeline's break. The visual inspection tool 25 in unclear water could be based on laminar clean water flooding.

Figure 8:
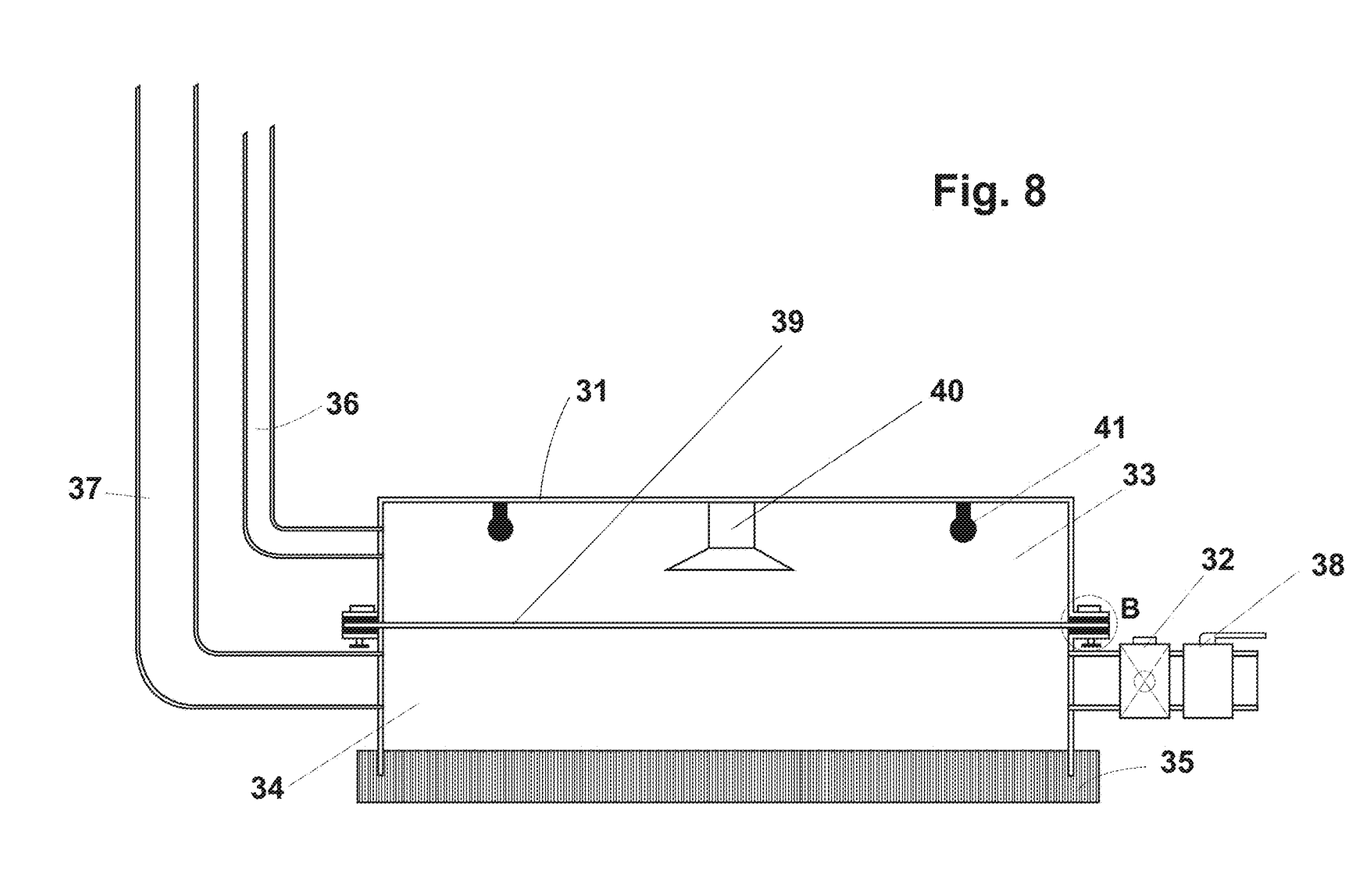
FIG. 8 shows a principle of an embodiment of the leak inspection tool.

The method and apparatus for close visual inspection in muddy/unclear waters will now be described, referring to FIG. 8.

The configuration of the equipment could vary depending on the configuration of the structure to be observed. The common operational characteristic however, is the same. The flooding box is shaped at its underside to correspond with the outer shape of the structure to be observed, so that it will fit on the part of the structure to be observed, be they pipelines, anodes etc. In the following is given a description for the clear water flooding technique for subsea pipelines leak close visual inspection in muddy/unclear water. The equipment generally comprises a housing 31. It is divided into two compartments 33 and 34 by a transparent wall 39, e.g. a glass sheave. The lower compartment 34 is open downwardly. Around the lower edge of the lower compartment is a soft foam padding 35 or other type of seal. The foam padding 35 is adapted to press against the pipeline to be observed to form a seal against this. In the upper compartment 33 is a camera 39 and a light source 41. Power and communication conduit 36 is connected to the upper compartment and a water line 37 is connected to the lower compartment.

The housing is brought against the wall of the pipe to be inspected so that the foam padding 35 forms a seal against the pipe. Then clean water is flooded from the topside through the water line 37. The lines from the power/communication conduit 37 are connected to a computer, and the topside engineer monitors the clearness on the computer screen and stops the flooding once clear water is dominating the lower compartment 34. The pressure is retained in the lower compartment 34 while the illuminating lamps 41 illuminates the area of interest and the camera 40 in the upper compartment 33 is observing through the transparent glass 39 and the clear water in the lower compartment 34. The view of this part of the pipeline enclosed by the equipment remains clear enough for good observations by the topside engineer for some good minutes.

The instrument can be moved 360 degrees round the circumference of the pipeline (provided the pipeline is lying freely above the bottom or is trenched free from the bottom sediments) and/or along the pipeline as the operator wishes. However, movements of the equipment around or along the pipeline often results in some reduction in clarity. Clarity is again regained by flooding with clean water from topside.

Should there be lumps, sediments or similar, which may not permeate through the soft foam, a valve 38 may be opened and the flooding is activated to flood away the sediments from the lower compartment 34 through a check valve 32 and the valve 38. The valve 38 is closed once clarity is regained.

For pipeline hole/crack geometry identification, an internal pressure in the pipeline very little above the pressure in the lower compartment 34 is sufficient for quick and easy finding.

Figure 9:
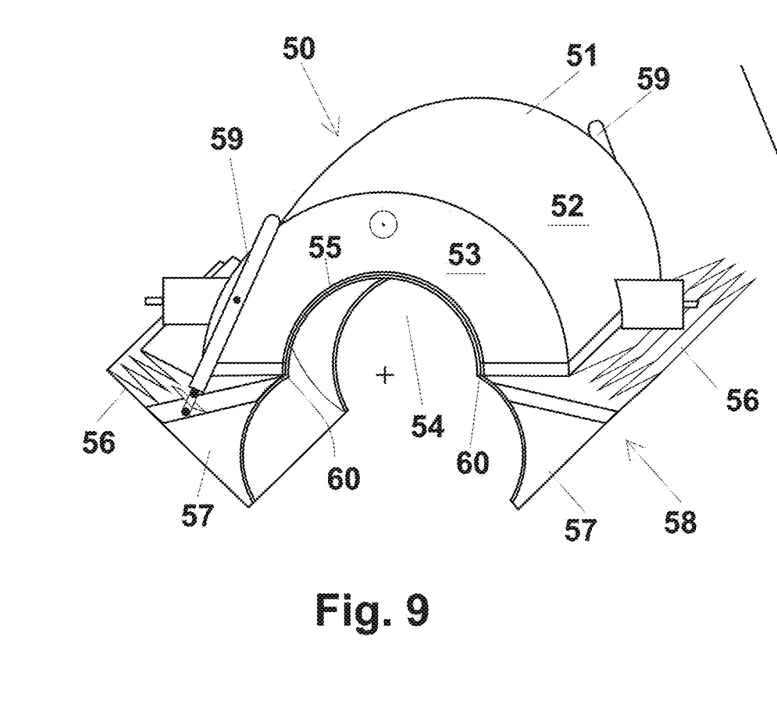
FIG. 9 shows first embodiment of a leak clamp in open position.
Figure 10:
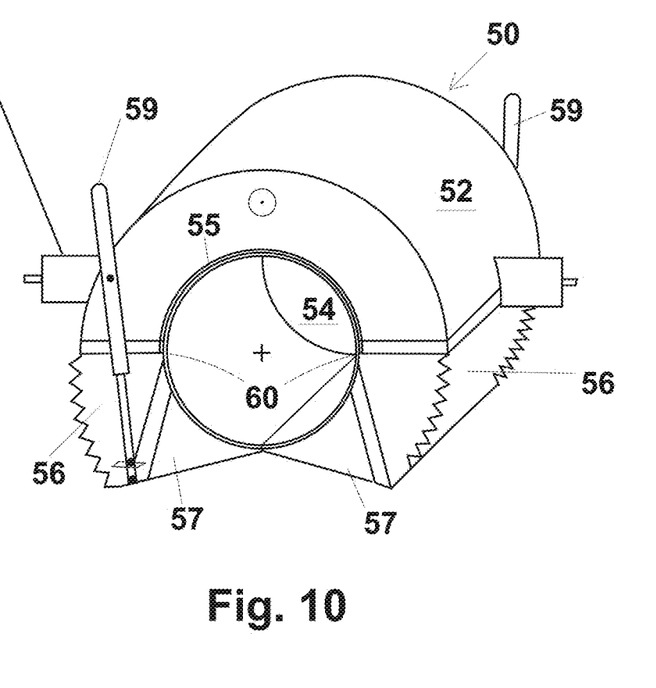
FIG. 10 shows the leak clamp of FIG. 9 in closed position.

FIGS. 9 and 10 show another embodiment of the inspection tool 25, according to the present invention. It comprises a housing 50, which is shown in an open position in FIG. 9. The housing 50 comprises a first half shell 51, which is shaped as a half cylinder wall 52 with end caps 53, of which only one is visible. In the end caps 53 a recess 54 has been made to accommodate the pipe to be encircled by the tool. A seal 55 may conveniently be attached to the edge of the recess 54.

A bellows 56 is attached to the each of the longitudinal edges of the first half shell 51. At the opposite side of each bellows 56 are attached second shells 57 that extends about a quarter of a circle. The second shells 57 are also hinged to the first shell 51 in a hinge 60. The bellows 56 and second shells 57 constitute the second haft shell 58 of the housing 50. An actuator 59, e.g., a hydraulic actuator, extends between the first half shell 51 and each of the second shells 57. By actuating these actuators 59, the second shells 57 can be moved towards one another so that they encircle the pipeline. The second shells 57 are shaped so that they can extend all the way around the underside of the pipe even if it is lying on the seabed. The fully closed tool is shown in FIG. 10. When the housing has been closed around the pipe, the housing is flooded with clean water through ports) not shown.

Inside the housing there is arranged at least one camera (not shown) that is encapsulated in a watertight chamber with a transparent wall between the camera and the pipe.

The tool described in connection with FIGS. 9 and 10 may have two cameras installed at 90° to each other such that a 45° turn on both sides of the pipeline from vertical enables full visual coverage (360° of the pipeline).

After the leak has been identified a decision can be made on the repair method.

If mechanical clamps are required to arrest the leak the clamping tool 28 may install a subsea clamp.

Another repair system that could be made is pumping of concrete or poly-products into a mould made around the leaking section.

A combination of these could also be envisaged where a mould is clamped on the pipeline and thereafter filled with concrete or poly-products to ensure tightness, such as will be described below, referring to FIGS. 11 and 12.

Figure 11:
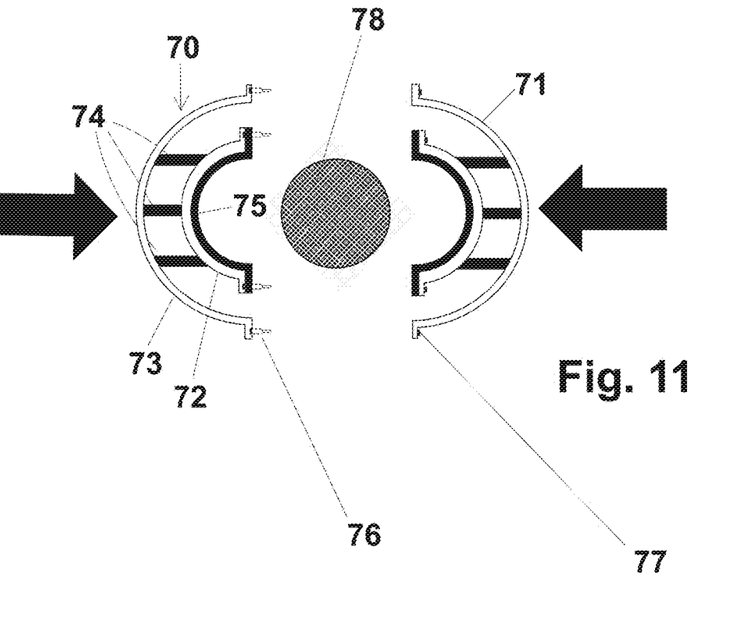
FIG. 11 shows a second embodiment of a leak clamp in closed position.
Figure 12:
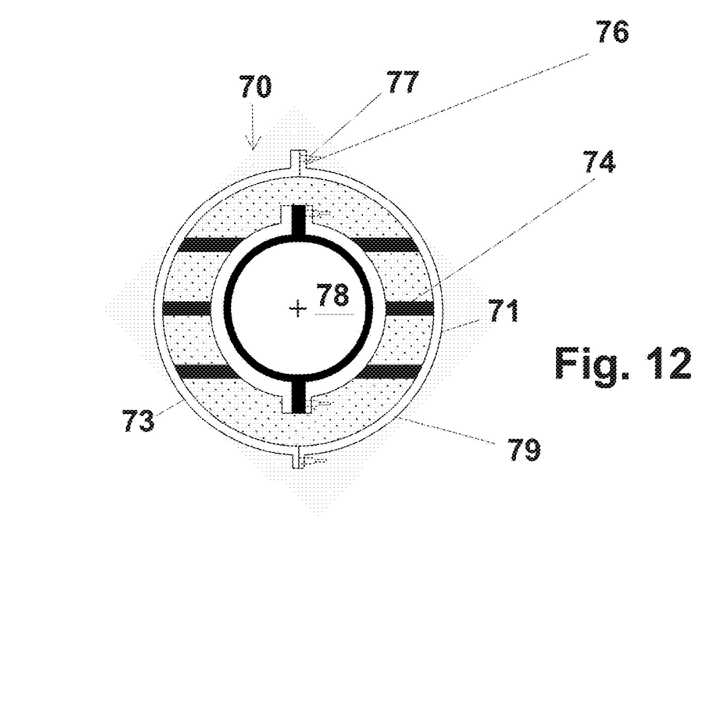

FIGS. 11 and 12 show a clamp 70 comprising two halves 70, 71. Each half 70, 71 comprises two shells, an inner shell 72 and an outer shell 73. The two shells are connected by webs 74. On the inside of the inner shell 72 a coating 75 of e.g. a soft sealing material, such as rubber, may be arranged.

The outer and inner shells 72, 73 are equipped with mating fastening means 76, 77, such as quick connect clips or bolts and nuts.

An ROV, equipped with flat jacks or any other form of hydraulic or pneumatic system to impose the force necessary to bring the two halves together around the pipe 78, can be used to install the clamp. When the clamp 70 has been arranged around the pipe 78 and the shells have been fasted by the fastening means 76, 77, a filler 79, such as concrete, is injected into the void between the inner shell 72 and the outer shell 73. The concrete may be reinforced for strength.

The invention claimed is:

1. Apparatus for identification of exiting substance from broken or leaking underwater equipment, such as a pipeline, wherein it comprises a housing defining a chamber with a water permeable side that is adapted to face downward during use, and thereby being exposed to the exiting substance, a gas pressurizing device for creating a gas/water interface within the housing, and an imaging device arranged above the water surface of the gas/water interface, the imaging device being adapted to image the water surface.

2. Apparatus according to claim 1, wherein the imaging device is at least one infra-red camera.

3. Apparatus according to claim 1, wherein it is carried by an ROV.

4. Method for identification of exiting substance from broken or leaking underwater equipment, such as a pipeline, wherein a housing containing an imaging device is submerged to a position above the underwater equipment, that a gas/water interface is created within the housing, that the gas/water interface is being exposed to the exiting substance so that presence of exiting substance may disturb the gas/water interface, and that the imaging device images the gas/water interface in order to detect if the gas/water interface is being disturbed.

5. Method according to claim 4, wherein when a disturbance of the gas/water interface is being detected, the housing is moved to maximise the disturbance and thereby locate the approximate origin of the leak causing the exiting substance.

6. Method according to claim 4, wherein said gas/water interface is imaged in infra-red light.

7. Method according to claim 4, wherein the housing is attached to an ROV.

8. Apparatus according to claim 1, wherein the air/water interface is within said chamber and the surface area of the air/water interface is greater than the surface area of the imaging device.

9. Apparatus according to claim 1 wherein said chamber is divided into an upper compartment and a lower compartment by a transparent wall.

10. Apparatus according to claim 2, wherein said at least one camera comprises an infra-red output function.

11. Apparatus according to claim 1, wherein an exit port having a valve is in fluid communication with said chamber in order to expel unclear water from said chamber.

12. Apparatus according to claim 1, wherein said apparatus is provided with a water line for flooding said chamber with clear water.

13. Apparatus according to claim 12 wherein said water line is connectable to said lower compartment.

14. Apparatus according to claim 13 wherein said lower compartment is open downwardly.

15. Method according to claim 6, wherein said gas/water interface is illuminated by infra-red light.

16. Method according to claim 4, comprising the step of providing clear water to said chamber in order to expel unclear water from said chamber.

17. Method according to claim 4, wherein the surface area of the air/water interface is arranged to be greater that the surface area of the imaging device.

18. Method according to claim 4, wherein a transparent wall is arranged in said chamber to form said air/water interface.

* * * * *